(12) United States Patent
Okabe et al.

(10) Patent No.: US 12,474,200 B2
(45) Date of Patent: Nov. 18, 2025

(54) METHOD FOR JUDGING ENVIRONMENT OF BALANCE, AND APPARATUS FOR THE SAME

(71) Applicant: A&D COMPANY, LIMITED, Tokyo (JP)

(72) Inventors: Kazuna Okabe, Saitama (JP); Hisanori Oda, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 284 days.

(21) Appl. No.: 18/269,493

(22) PCT Filed: Dec. 25, 2020

(86) PCT No.: PCT/JP2020/048693
§ 371 (c)(1),
(2) Date: Jun. 23, 2023

(87) PCT Pub. No.: WO2022/137501
PCT Pub. Date: Jun. 30, 2022

(65) Prior Publication Data
US 2024/0060816 A1 Feb. 22, 2024

(51) Int. Cl.
*G01G 23/01* (2006.01)
*E05F 15/70* (2015.01)
*G01G 21/28* (2006.01)

(52) U.S. Cl.
CPC ............ *G01G 23/01* (2013.01); *E05F 15/70* (2015.01); *G01G 21/286* (2013.01); *E05Y 2999/00* (2024.05)

(58) Field of Classification Search
CPC ....... G01G 23/01; G01G 21/286; E05F 15/70; E05Y 2999/00
(Continued)

(56) References Cited

U.S. PATENT DOCUMENTS 4,932,487 A * 6/1990 Melcher ............... G01G 21/286
73/1.13
5,056,050 A 10/1991 Fuchs et al.
(Continued)

FOREIGN PATENT DOCUMENTS

JP  S62-280624 A  12/1987
JP  H07-023239 U   4/1995
(Continued)

*Primary Examiner* — Nathaniel T Woodward
(74) *Attorney, Agent, or Firm* — Studebaker Brackett PLLC (57) ABSTRACT

An electronic balance includes a weighing pan, a windshield, door opening and closing mechanisms configured to automatically open and close doors of the windshield, a weight sensor, a built-in weight, a weight applying and removing mechanism for the built-in weight, and a control unit, the control unit obtains a first standard deviation measured while the doors of the windshield are left closed, and a second standard deviation measured accompanied by a series of opening and closing operations consisting of opening the door by the door opening and closing mechanism, loading the built-in weight by the weight applying and removing mechanism, closing the door by the door opening and closing mechanism, acquiring weighing data of the built-in weight, opening the door by the door opening and closing mechanism, unloading the built-in weight by the weight applying and removing mechanism, and closing the door by the opening and closing mechanism.

5 Claims, 8 Drawing Sheets

(58) Field of Classification Search
USPC .......................................................... 73/1.13
See application file for complete search history.

(56) References Cited

U.S. PATENT DOCUMENTS

| | | |
|---|---|---|
| 8,203,086 B2 | 6/2012 | Izumo et al. |
| 2009/0020341 A1 | 1/2009 | Hamamoto et al. |
| 2013/0068542 A1 | 3/2013 | Izumo et al. |
| 2015/0204716 A1* | 7/2015 | Lewandowski ......... E05F 15/73 177/180 |
| 2016/0250628 A1 | 9/2016 | Graf et al. |
| 2021/0156731 A1 | 5/2021 | Oda |
| 2024/0094048 A1 | 3/2024 | Okabe et al. |
| 2024/0094049 A1 | 3/2024 | Oda |

FOREIGN PATENT DOCUMENTS

| | | |
|---|---|---|
| JP | 2001-133317 A | 5/2001 |
| JP | 2007-212254 A | 8/2007 |
| JP | 2012-002677 A | 1/2012 |
| JP | 2012-007970 A | 1/2012 |
| JP | 4851882 B2 | 1/2012 |
| JP | 5062880 B2 | 10/2012 |
| WO | 2006/082915 A1 | 8/2006 |
| WO | 2020/129190 A1 | 6/2020 |

* cited by examiner

```
----- TEST -----

A & D
MODEL      BA-6T
S/N     T2103421
ID 0000000000000
DATE  2020/09/02
TIME   19:39:41
INTERNAL WEIGHT

SDbp
(balance performance)
  S.D.    0.0010 mg

SDep
(environment performance)
  S.D.    0.0020 mg
JUDGMENT
  PERFORMANCE    A

REMARKS

SIGNATURE
```

METHOD FOR JUDGING ENVIRONMENT OF BALANCE, AND APPARATUS FOR THE SAME

TECHNICAL FIELD

The present invention relates to a method for judging a surrounding environment of an electronic balance, and an electronic balance for the same.

BACKGROUND ART

With a high-accuracy electronic balance whose weighed value minimum display (reading accuracy) is 0.1 mg or less, it is known that a surrounding environment of the balance influences the weighing accuracy. Therefore, in many cases, an electronic balance is provided with a windshield to prevent air flow around a weighing pan serving as one of the factors that lowers weighing accuracy (for example, Patent Literature 1). Further, many of the electronic balances include built-in weights whose mass is known, and have an automatic calibration function to automatically confirm the repeatability (standard deviation) of the balance (for example, Patent Literature 2).

CITATION LIST

Patent Literatures

[Patent Literature 1] Japanese Patent No. 5062880
[Patent Literature 2] Japanese Patent No. 4851882

SUMMARY OF INVENTION

Technical Problem

In a case of an electronic balance with a windshield, the confirmation of repeatability described above, that is, built-in weight applying and removing operations for obtaining a standard deviation of the built-in weight are performed in a state where the windshield is closed. However, at the time of actual weighing, a user performs weighing in a serial flow in which the user opens a door of the windshield and loads a to-be-weighed object, closes the door and measures weighing data of the to-be-weighed object, and opens the door and unloads the to-be-weighed object, so that door opening and closing are inevitable.

Therefore, there were many reports that the weighing performance guaranteed for the balance could not be obtained although the repeatability was confirmed before weighing, and there is a need to know to what extent the surrounding environment has influence under conditions of actual use by a user accompanied by the series of opening and closing operations.

The present invention was made to solve the problem described above, and an object thereof is to provide a method for judging an influence of a surrounding environment of an electronic balance under conditions close to actual use by a user, and an electronic balance for the same.

Solution to Problem

In order to solve the problem described above, an electronic balance according to an aspect of the present invention includes a weighing pan on which a to-be-weighed object is placed, a windshield surrounding the weighing pan, a door opening and closing mechanism configured to automatically open and close a door of the windshield, a weight sensor to which a load applied to the weighing pan is transmitted, a built-in weight to be loaded on and unloaded from the weight sensor, a weight applying and removing mechanism for the built-in weight, and a control unit configured to measure a standard deviation of the built-in weight and control the door opening and closing mechanism and the weight applying and removing mechanism, wherein the control unit obtains a first standard deviation measured while the door of the windshield is left closed, and a second standard deviation measured accompanied by a series of opening and closing operations consisting of opening the door by the door opening and closing mechanism, loading the built-in weight by the weight applying and removing mechanism, closing the door by the door opening and closing mechanism, acquiring weighing data of the built-in weight, opening the door by the door opening and closing mechanism, unloading the built-in weight by the weight applying and removing mechanism, and closing the door by the opening and closing mechanism.

In the aspect described above, it is also preferable that when the second standard deviation is larger than the first standard deviation, the control unit notifies a user that there is an influence from a surrounding environment caused by opening and closing of the door.

In the aspect described above, it is also preferable that the control unit ranks a difference value between the second standard deviation and the first standard deviation, or a square root value of a difference between the square of the second standard deviation and the square of the first standard deviation according to an evaluation threshold set in consideration of an internal design of the electronic balance, and evaluates an influence from a surrounding environment caused by opening and closing of the door.

In the aspect described above, it is also preferable that the control unit further measures a first stabilization time until fluctuation in weighing data of the built-in weight is stabilized when measuring the first standard deviation, and a second stabilization time until fluctuation in weighing data of the built-in weight is stabilized when measuring the second standard deviation, and when the second stabilization time is longer than the first stabilization time, calculates a time as an additional stabilization time by subtracting the first stabilization time from the second stabilization time, and notifies a user of the additional stabilization time.

In order to solve the problem described above, a method for judging a surrounding environment of an electronic balance according to an aspect of the present invention is a method for judging a surrounding environment of an electronic balance including a weighing pan on which a to-be-weighed object is placed, a windshield surrounding the weighing pan, a door opening and closing mechanism configured to automatically open and close a door of the windshield, a weight sensor to which a load applied to the weighing pan is transmitted, a built-in weight to be loaded on and unloaded from the weight sensor, a weight applying and removing mechanism for the built-in weight, and a control unit configured to measure a standard deviation of the built-in weight and control the door opening and closing mechanism and the weight applying and removing mechanism, and includes a step of measuring a first standard deviation of the built-in weight by repeating loading and unloading of the built-in weight by the weight applying and removing mechanism while the door of the windshield is left closed, and a step of measuring a second standard deviation of the built-in weight by repeating a series of opening and closing operations consisting of opening the door by the door opening and closing mechanism, loading the built-in weight by the weight applying and removing mechanism, closing the door by the door opening and closing mechanism, acquiring weighing data of the built-in weight, opening the door by the door opening and closing mechanism, unloading the built-in weight by the weight applying and removing mechanism, and closing the door by the opening and closing mechanism.

Advantageous Effects of Invention

According to the present invention, a surrounding environment of an electronic balance can be judged under conditions close to actual use by a user.

DESCRIPTION OF EMBODIMENTS

Next, preferred embodiments of the present invention will be described based on the drawings.
(Configuration of Electronic Balance)

Figure 1:
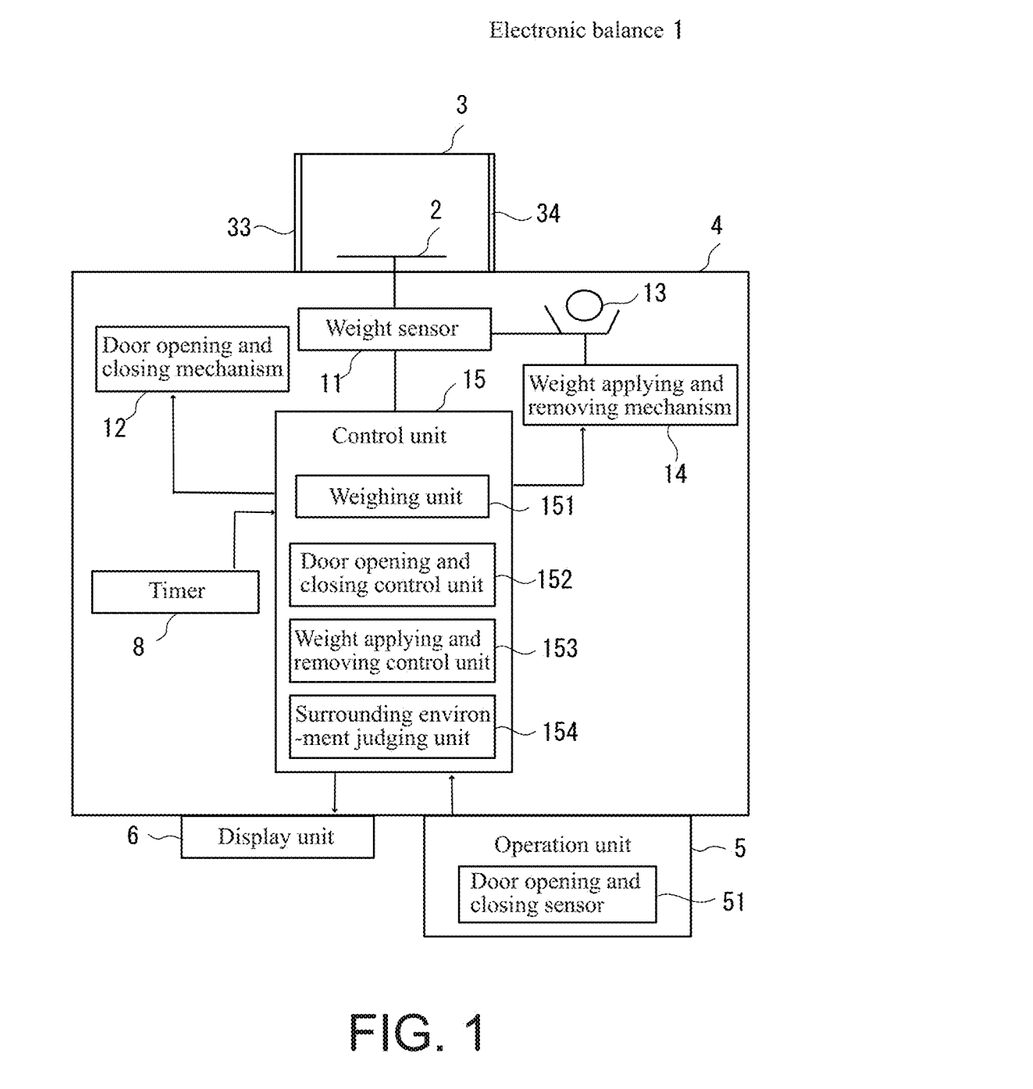
FIG. 1 is a component block diagram of an electronic balance according to an embodiment of the present invention.
Figure 2:
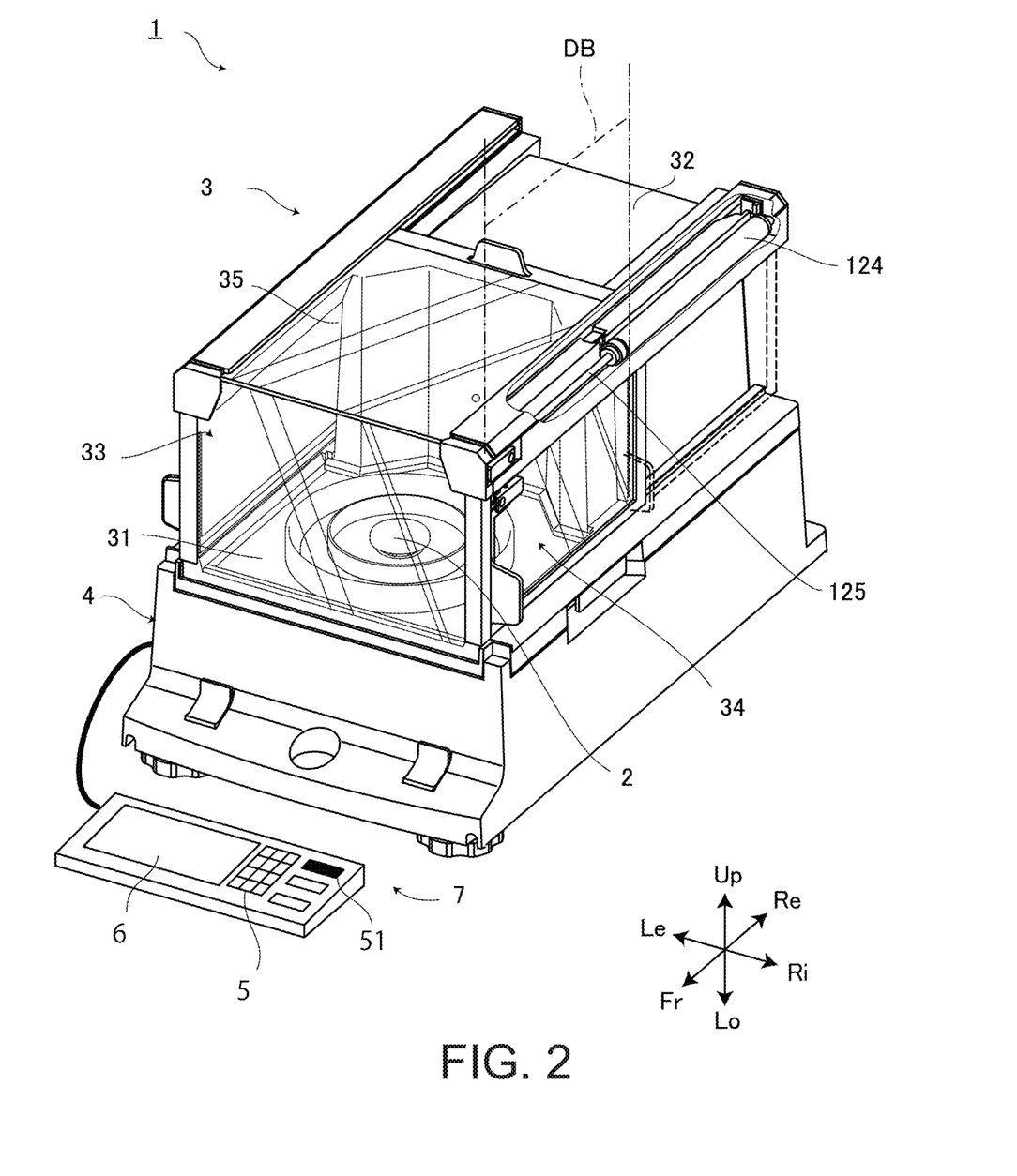
FIG. 2 illustrates an example of an apparatus configuration of the same electronic balance.

FIG. 1 is a component block diagram of an electronic balance according to an embodiment of the present invention. FIG. 2 illustrates an example of an apparatus configuration of the electronic balance illustrated in FIG. 1, and is a right-side perspective view of the same configuration example. As illustrated in FIG. 1, an electronic balance 1 (hereinafter, simply referred to as a balance 1) includes a weighing pan 2, a windshield 3, a balance main body 4, an operation unit 5, a display unit 6, a timer 8, a weight sensor 11, a door opening and closing mechanism 12, a built-in weight 13, a weight applying and removing mechanism 14, and a control unit 15. FIG. 2 illustrates a configuration example embodying the balance 1, and hereinafter, the components mentioned above will be described with reference to FIG. 2.

The balance main body 4 is a case in which the weight sensor 11, the door opening and closing mechanism 12, the built-in weight 13, the weight applying and removing mechanism 14, the control unit 15, and the timer 8 are included, and the weighing pan 2 is disposed at a center of an upper portion of the balance main body 4.

The operation unit 5 and the display unit 6 are provided on a control panel 7, and the control panel 7 is connected to the balance main body 4 by a cable. The operation unit 5 includes key switches necessary for operating the balance 1, and on a screen of the display unit 6, a menu and results relating to weighing, and further, a menu and results relating to surrounding environment judgment to be described later, are displayed. However, the control panel 7 and the balance main body 4 may be connected wirelessly. The operation unit 5 and the display unit 6 may be provided on the balance main body 4. It is also preferable that the operation unit 5 includes a door opening and closing sensor (or button) 51 that triggers automatic opening and closing of the door opening and closing mechanism 12 to be described later.

The windshield 3 has a bottomless box shape, and is detachably attached to the balance main body 4. For an attaching and detaching mechanism, a conventionally known configuration, for example, the configuration disclosed in Japanese Patent No. 5062880, etc., disclosed as a patent literature may be used. However, a configuration for which the windshield 3 and the balance main body 4 are integrated in a non-separable manner is also possible. The windshield 3 includes a front plate 31 at a front side, a back case 32 at a rear side, and opening and closing doors on left and right sides (hereinafter, the door on the left side is referred to as a left door 33, and the door on the right side is referred to as a right door 34), and an opening and closing door at an upper side (hereinafter, referred to as an upper door 35). The front plate 31, the back case 32, the left door 33, the right door 34, and the upper door 35 define a weighing chamber surrounding the weighing pan 2 in all directions. Note that the expressions containing front, rear, left, upper/up, and lower/down used in the present description refer to directions indicated by the arrows Fr-Re (Front-Rear), Le-Ri (Left-Right), Up-Lo (Up-Down) illustrated in FIG. 2, respectively.

The front plate 31, the left door 33, the right door 34, and the upper door 35 are made of a transparent glass or resin so that an internal state can be observed. The back case 32 is made of, for example, glass, metal, or plastic. Each of the upper door 35, the left door 33, and the right door 34 is provided with a handle that assists door sliding. The upper door 35 can be manually opened and closed in the front-rear direction, and the left door 33 and the right door 34 can be automatically opened and closed in the front-rear direction by the door opening and closing mechanism 12 to be described later.

As the weight sensor 11, an electromagnetic balance type, a strain gauge type, or a capacitive type is used. To the weight sensor 11, a load of a to-be-weighed object placed on the weighing pan 2 is transmitted through a load transmitting mechanism (not illustrated) such as a beam. A load detected by the weight sensor 11 is output as weighing data to the control unit 15. To the weight sensor 11, the built-in weight 13 is also applied, and weighing data of the built-in weight 13 is also output to the control unit 15.

The timer 8 acquires a current time (system time) of the balance 1 by calculating count values of a hardware timer and a software timer. The timer 8 may be a built-in clock of the control unit 15.

The control unit 15 is, for example, a microcontroller configured by mounting a CPU and a memory, etc., on an integrated circuit. The control unit 15 includes a weighing unit 151 that calculates a weighed value from weighing data detected by the weight sensor 11, a door opening and closing control unit 152 that controls the door opening and closing mechanism 12, a weight applying and removing control unit 153 that controls the weight applying and removing mechanism 14, and a surrounding environment judging unit 154. These functional units 151 to 154 are configured by electronic circuits such as a CPU (Central Processing Unit), an ASIC (Application Specific Integrated Circuit), and an PLD (Programmable Logic Device) such as FPGA (Field Programmable Gate Array).

The weighing unit 151 acquires weighing data of a to-be-weighed object by converting an analog signal detected by the weight sensor 11 into a digital signal. When a to-be-weighed object is placed on the weighing pan 2, the weighing unit 151 waits for a predetermined period of time (hereinafter, referred to as an "acquisition time." The acquisition time is set in advance, and stored in the memory of the control unit 15) in which fluctuation in weighing data of the to-be-weighed object is expected to be stabilized, and calculates a weighed value by subtracting weighing data obtained in a state where the to-be-weighed object is not on the weighing pan 2 from the weighing data. Details of the functions of the door opening and closing control unit 152, the weight applying and removing control unit 153, and the surrounding environment judging unit 154 will be described later.

The built-in weight 13 is a weight whose weight is known disposed in the balance main body 4 for calibration of the balance. The known weight of the built-in weight 13 is stored in advance in the memory of the control unit 15.

Figure 3:
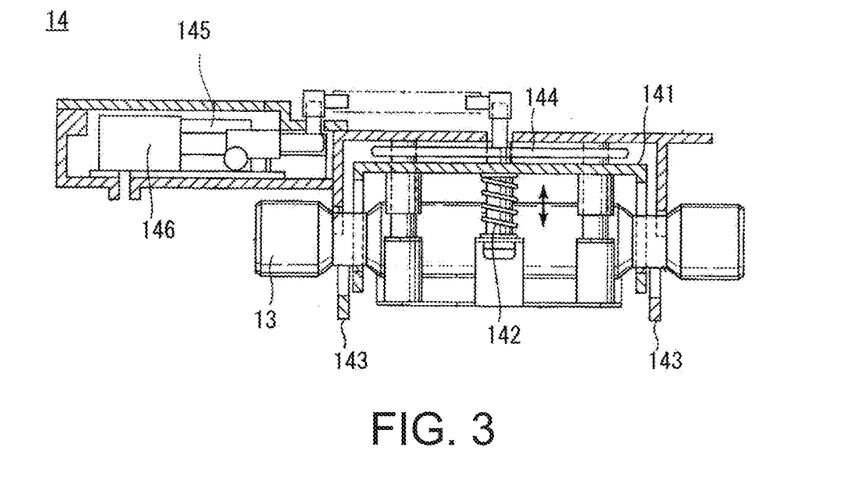
FIG. 3 illustrates a configuration example of a weight applying and removing mechanism in the same electronic balance.

The built-in weight 13 is loaded on and unloaded from the weight sensor 11 by the weight applying and removing mechanism 14. FIG. 3 illustrates a configuration example of the weight applying and removing mechanism 14, and is a longitudinal sectional view of the same configuration example. The weight applying and removing mechanism 14 includes the built-in weight 13, a weight holder 141, a spring 142, a load receiving portion 143, an air bag 144, a bag pressurization pump 145, and a bag one-way solenoid valve 146. The built-in weight 13 is held by the weight holder 141, and the weight holder 141 is biased upward by the spring 142. The air bag 144 is disposed at a position where the air bag pushes down the weight holder 141 downward, and the bag pressurization pump 145 and the bag one-way solenoid valve 146 are connected to the air bag 144. The load receiving portion 143 is connected to the weight sensor 11 via a load transmitting mechanism (not illustrated) different from the weighing pan 2.

The weight applying and removing mechanism 14 is controlled by the weight applying and removing control unit 153 of the control unit 15. When loading the built-in weight 13 on the weight sensor 11, the weight applying and removing control unit 153 activates the bag pressurization pump 145 to inflate the air bag 144, push down the weight holder 141 against the biasing force of the spring 142, apply a load of the built-in weight 13 to the load receiving portion 143, and transmit the full load of the built-in weight 13 to the weight sensor 11. On the other hand, when unloading the built-in weight 13 from the weight sensor 11, the weight applying and removing control unit 153 opens the bag one-way solenoid valve 146 to the atmosphere to deflate the air bag 144, push up the weight holder 141 by the biasing force of the spring 142, and remove the load of the built-in weight from the load receiving portion 143.

Figure 4:
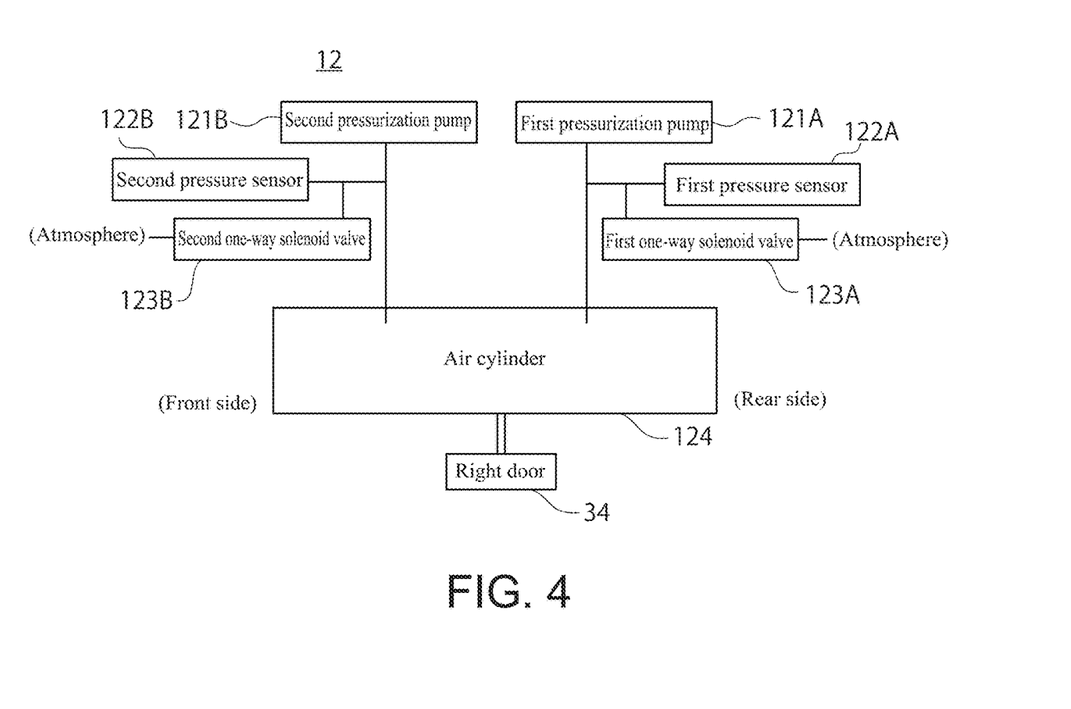
FIG. 4 illustrates a configuration example of a door opening and closing mechanism in the same electronic balance.

FIG. 4 illustrates a configuration example of the door opening and closing mechanism 12, and is a block diagram of the same configuration example. The door opening and closing mechanism 12 is provided for each of the left door 33 and the right door 34, and is independently controlled by the door opening and closing control unit 152. Hereinafter, description will be given with use of the right door 34.

For the right door 34, the door opening and closing mechanism 12 includes a first pressurization pump 121A, a second pressurization pump 121B, a first pressure sensor 122A, a second pressure sensor 122B, a first one-way solenoid valve 123A, a second one-way solenoid valve 123B, and an air cylinder 124. The first pressurization pump 121A and the second pressurization pump 121B are air pumps. Outlet sides of the first one-way solenoid valve 123A and the second one-way solenoid valve 123B are opened to the atmosphere, and by opening and closing the valves, air flowing and stoppage are controlled. The first pressure sensor 122A monitors a pressure of air discharged from the first pressurization pump 121A, and the second pressure sensor 122B monitors a pressure of air discharged from the second pressurization pump 121B. The first pressure sensor 122A and the second pressure sensor 122B are respectively connected to the air cylinder 124, and monitor a pressure of air inside the air cylinder 124. The air cylinder 124 is housed in an upper end portion of the right door 34 together with a piston rod 125 (FIG. 2). Other components are housed in the back case 32. Moreover, to the rear side of the air cylinder 124, the first pressurization pump 121A for advancing the right door 34 is connected, and to the front side of the air cylinder 124, the second pressurization pump 121B for retreating the right door 34 is connected.

The door opening and closing mechanism 12 is controlled by the door opening and closing control unit 152 of the control unit 15. When opening the right door 34 (when moving the door rearward), the door opening and closing control unit 152 does not activate the first pressurization pump 121A but opens the first one-way solenoid valve 123A and closes the second one-way solenoid valve 123B to pressurize the second pressurization pump 121B, so as to retreat the right door 34 by air pressure of the second pressurization pump 121B. On the other hand, when closing the right door 34 (when moving the door forward), the door opening and closing control unit 152 does not activate the second pressurization pump 121B but opens the second one-way solenoid valve 123B and closes the first one-way solenoid valve 123A to pressurize the first pressurization pump 121A, so as to advance the right door 34 by air pressure of the first pressurization pump 121A. Each time the right door 34 is fully opened or fully closed, the pressure sensor 122A, 122B detects a sudden pressure increase, so that the door opening and closing control unit 152 stops the pressurization, opens the valves to release the air to the atmosphere, so as to stop the movement of the right door 34.

Concerning the weight applying and removing mechanism 14, details of the configuration illustrated in FIG. 3 are described in Japanese Patent No. 4851882 disclosed as a patent literature. However, the weight applying and removing mechanism 14 may be configured, for example, to load and unload the built-in weight 13 to and from the load receiving portion connected to the weight sensor 11 by a motor and a cam mechanism. Concerning the door opening and closing mechanism 12, the configuration illustrated in FIG. 4 is described in detail in International Application No. PCT/JP 2020/011748. However, the door opening and closing mechanism 12 may be configured, for example, to move the door by a motor and a rack-and-pinion or a feed screw.

(Surrounding Environment Judgment Flow)

Figure 5:
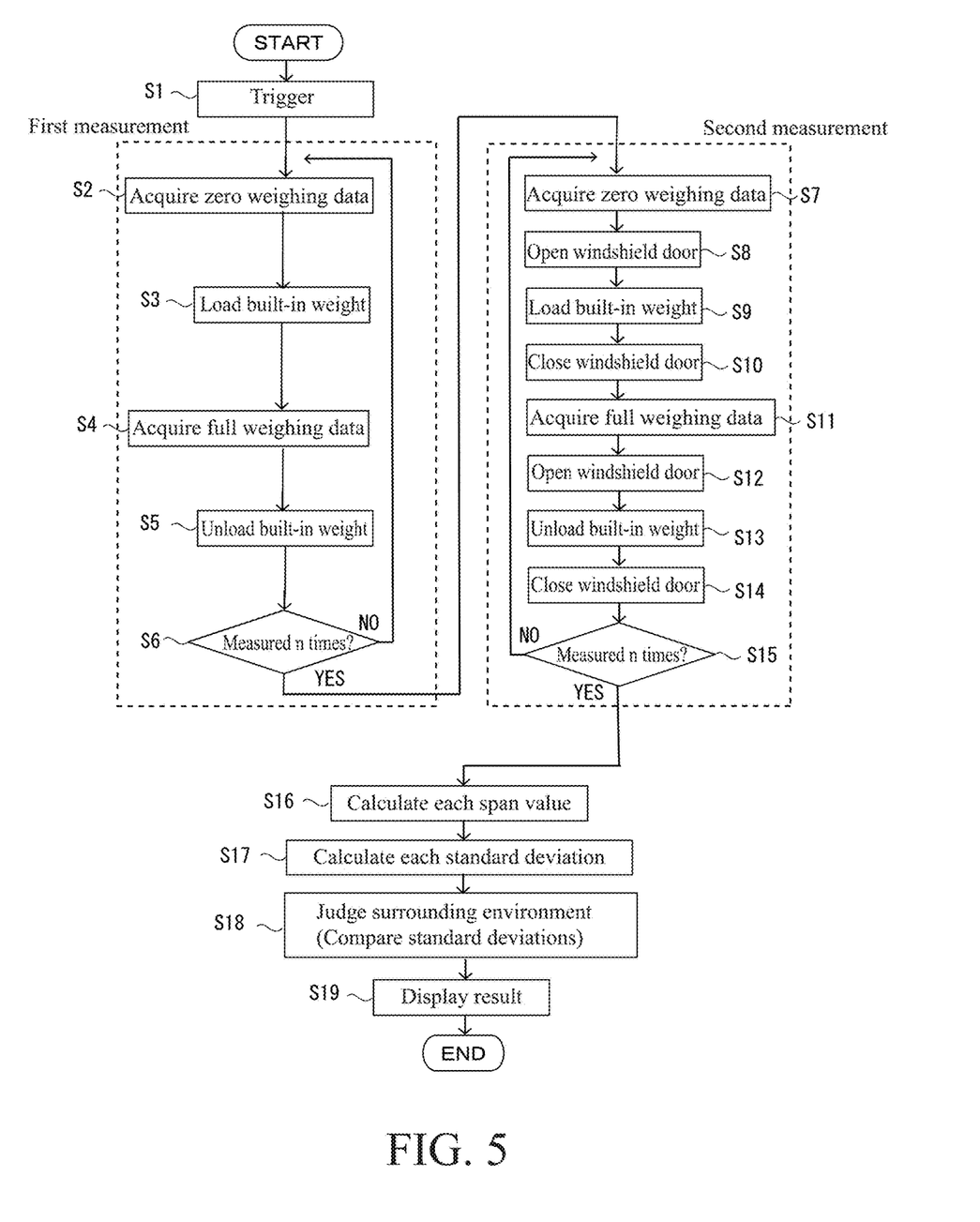
FIG. 5 is a flowchart of surrounding environment judgment according to an embodiment of the present invention.

Next, a surrounding environment judgment method using the balance 1 described above will be described. FIG. 5 is a flowchart of surrounding environment judgment according to an embodiment of the present invention.

First, in Step S1, for example, when a user opens a surrounding environment judgment menu from the operation unit 5 and selects START, this triggers surrounding environment judgment to start. Alternatively, surrounding environment judgment may be configured to be automatically started before starting weighing, for example, when a user operates the door opening and closing sensor 51 to open the door.

When the surrounding environment judgment is started, first, a first measurement is performed in which measurements are made while the doors of the windshield 3 are left closed (Steps S2 to S6).

As the processing shifts to Step S2, after an acquisition time elapses, the weighing unit 151 acquires weighing data in a state where neither the built-in weight 13 nor a to-be-weighed object is applied to the weight sensor 11 (hereinafter, referred to as "zero weighing data").

Next, the processing shifts to Step S3, and the weight applying and removing control unit 153 controls the weight applying and removing mechanism 14 to load the built-in weight 13 on the load receiving portion 143.

Next, the processing shifts to Step S4, and after the acquisition time elapses, the weighing unit 151 acquires weighing data of the built-in weight 13 (hereinafter, referred to as "full weighing data").

Next, the processing shifts to Step S5, and the weight applying and removing control unit 153 controls the weight applying and removing mechanism 14 to unload the built-in weight 13 from the load receiving portion 143.

Next, the processing shifts to Step S6, and the surrounding environment judging unit 154 counts up the number of measurements of the built-in weight 13, and determines whether the number of measurements has reached the number of times (n times) set in advance. When the set number of times is not reached (No), the processing returns to Step S2. When the set number of times is reached (Yes), the processing shifts to Step S7. n is preferably 5 to 10.

As the first measurement is finished, next, a second measurement is performed in which measurements are made accompanied by opening and closing of the door of the windshield 3 (Steps S7 to S15).

As the processing shifts to Step S7, after the acquisition time elapses, the weighing unit 151 acquires zero weighing data.

Next, in Step S8, the door opening and closing control unit 152 controls the door opening and closing mechanism 12 to open either the left or right door (which is to be set by a user. Hereinafter, description will be made with use of the right door 34). Due to opening of the right door 34, the environment in the weighing chamber is influenced by an environment outside the weighing chamber.

Next, the processing shifts to Step S9, and the weight applying and removing control unit 153 controls the weight applying and removing mechanism 14 to load the built-in weight 13 on the load receiving portion 143.

Next, the processing shifts to Step S10, and the door opening and closing control unit 152 controls the door opening and closing mechanism 12 to close the right door 34.

Next, the processing shifts to Step S11, and after the acquisition time elapses, the weighing unit 151 acquires full weighing data of the built-in weight 13.

Next, the processing shifts to Step S12, and the door opening and closing control unit 152 controls the door opening and closing mechanism 12 to open the right door 34. Due to opening of the right door 34, the environment in the weighing chamber is influenced by an environment outside the weighing chamber again.

Next, the processing shifts to Step S13, and the weight applying and removing control unit 153 controls the weight applying and removing mechanism 14 to unload the built-in weight 13 from the load receiving portion 143.

Next, the processing shifts to Step S14, and the door opening and closing control unit 152 controls the door opening and closing mechanism 12 to close the right door 34.

Next, the processing shifts to Step S15, and the surrounding environment judging unit 154 counts up the number of measurements of the built-in weight 13, and determines whether the number of measurements has reached the number of times (n times) set in advance. When the set number of times is not reached (No), the processing returns to Step S7. When the set number of times is reached (Yes), the processing shifts to Step S16. n is the same number as in the first measurement, and is preferably 5 to 10.

As the processing shifts to Step S16, the surrounding environment judging unit 154 calculates a span value (difference between full weighing data and zero weighing data) of each of the first measurement and the second measurement.

Next, the processing shifts to Step S17, and the surrounding environment judging unit 154 calculates a standard deviation of the span value of each of the first measurement and the second measurement.

Here, the standard deviation obtained in the first measurement (which is referred to as "first standard deviation") represents the repeatability obtained in a state where the doors are closed, and can be grasped as the performance that the apparatus of the balance 1 can currently exhibit (performance that can be exhibited when there is no influence from the surrounding environment). Therefore, to the first standard deviation obtained in the first measurement, a reference sign "SDbp (standard deviation of balance performance)" is attached.

On the other hand, the standard deviation obtained in the second measurement (which is referred to as "second standard deviation") represents the repeatability obtained at the time of loading and unloading of the built-in weight 13 accompanied by the series of opening and closing operations that are performed when weighing a to-be-weighed object in actuality, and can be grasped as the performance that the apparatus of the balance 1 exhibits under the influence of the surrounding environment. Therefore, hereinafter, to the second standard deviation obtained in the second measurement, a reference sign "SDep (standard deviation of environment performance) is attached.

Next, the processing shifts to Step S18, and the surrounding environment judging unit 154 judges the surrounding environment of the balance 1 by using the first standard deviation SDbp and the second standard deviation SDep.

In the surrounding environment judgment, the first standard deviation SDbp and the second standard deviation SDep are compared, and whether the second standard deviation SDep is larger than the first standard deviation SDbp is judged. When SDbp exceeds SDep, judgment is made impossible. However, it is considered that SDbp exceeding SDep rarely takes place. When SDep is larger than SDbp, due to the influence of the surrounding environment, the performance (repeatability) of the balance 1 at the time of actual weighing may possibly be inferior to the performance (repeatability) that the apparatus of the balance 1 can currently exhibit.

Next, the processing shifts to Step S19, and the surrounding environment judging unit 154 displays a result of the surrounding environment judgment in Step S18 on the display unit 6. As a result of the surrounding environment judgment, at least numerical values of the first standard deviation SDbp and the second standard deviation SDep are displayed on the display unit 6.

Further, when the second standard deviation SDep is larger than the first standard deviation SDbp, the surrounding environment judging unit 154 preferably displays a comment for notifying a user that there is an influence from the surrounding environment caused by opening and closing of the door, for example, "Performance may be influenced by wind," along with the numerical values. When the balance 1 includes a buzzer, a light, or the like, the notification to the user may be performed by sound or light.

Effect

It is known that as the accuracy of an electronic balance becomes higher, air flowing in the weighing chamber has greater influence on weighing. Therefore, for confirmation of the weighing performance, the electronic balance has an automatic calibration function to perform calibration by automatically applying and removing a built-in weight periodically or at the time of a user's operation. However, automatic application and removal of the built-in weight during calibration are performed in a state where the windshield is closed. Therefore, there were many reports that even after the calibration was performed, the weighing performance guaranteed for the balance could not be obtained at the time of weighing.

In contrast, according to the balance 1 and the surrounding environment judgment method of the balance 1 according to the present embodiment, two standard deviations are measured that are the repeatability (first standard deviation SDbp) in a state where the windshield 3 is closed and the repeatability (second standard deviation SDep) obtained accompanied by a series of opening and closing operations that are performed at the time of actual weighing of a to-be-weighed object by a user. By obtaining the repeatability without door opening and closing (first standard deviation SDbp) and the repeatability with door opening and closing (second standard deviation SDep), to what extent the surrounding environment has influence under conditions of actual use for weighing can be known.

Further, when the second standard deviation SDep is larger than the first standard deviation SDbp, by notifying the user that there is an influence from the surrounding environment caused by opening and closing of the door, the user himself/herself can be urged to take a response such as stopping the air conditioner, using a double windshield, or moving out of the wind.

Next, preferred modifications of the balance 1 according to the embodiment will be described. The same configuration as in the embodiment is provided with the same reference sign, and description thereof will be omitted.

Modification 1

(Surrounding Environment Evaluation)

Figure 6:
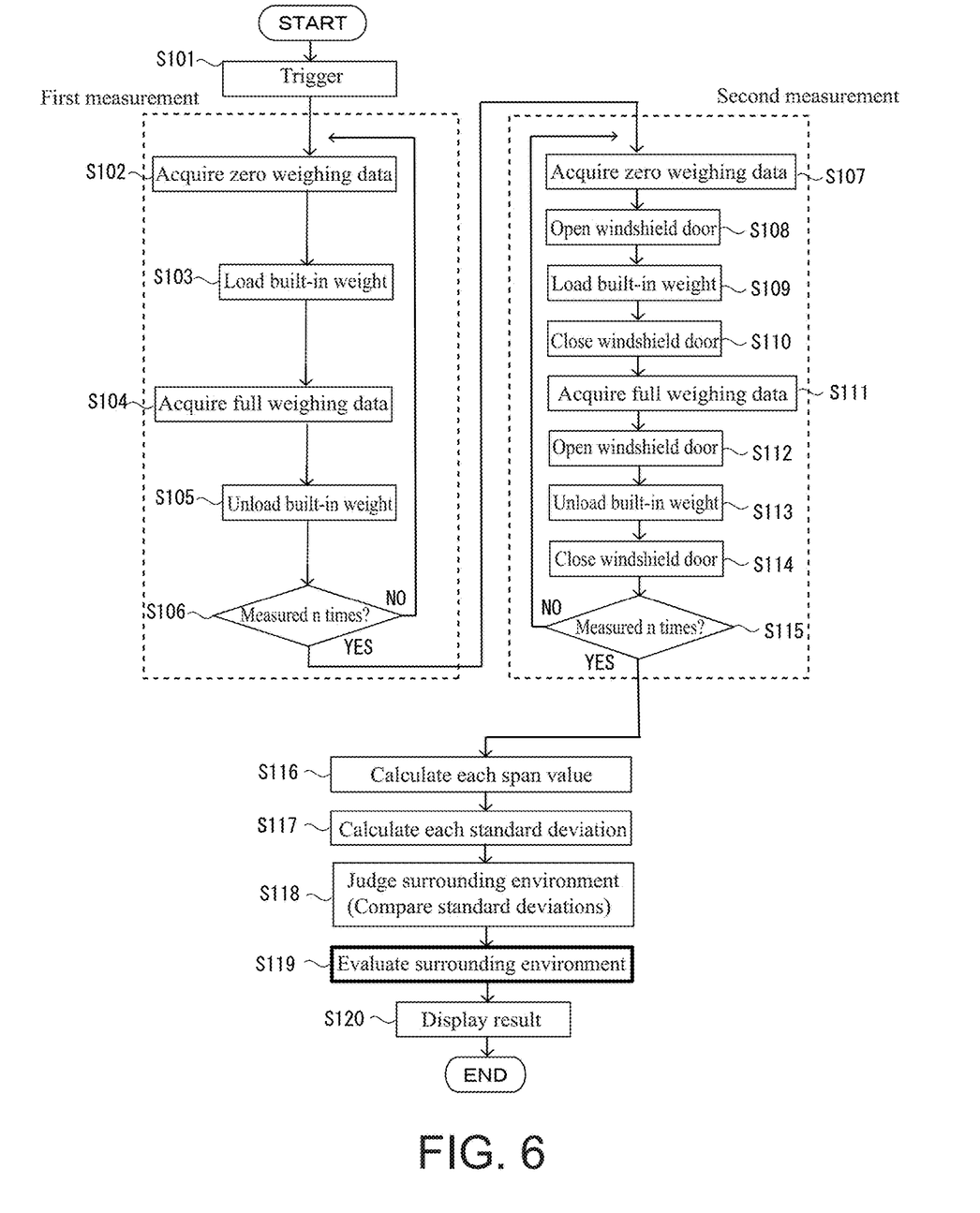
FIG. 6 is a flowchart of surrounding environment judgment according to Modification 1 of the embodiment of the present invention.

An electronic balance 1 according to Modification 1 of the embodiment of the present invention has the same configuration as in the embodiment (FIG. 1). Besides this configuration, the electronic balance 1 of Modification 1 also performs "evaluation" of the surrounding environment in addition. FIG. 6 is a flowchart of surrounding environment judgment according to Modification 1 of the embodiment of the present invention.

Steps S101 to S118 of Modification 1 are the same as Steps S1 to S18 of the embodiment (FIG. 5). That is, when an option "Evaluate" is also selected on the surrounding environment judgment menu in Step S101, this triggers surrounding environment evaluation to start. The first measurement is performed in Steps S102 to S106, the second measurement is performed in Steps S107 to S115, and then, a first standard deviation SDbp obtained in a state where the doors of the windshield are closed and a second standard deviation SDep obtained accompanied by door opening and closing are measured in Steps S117 and S118.

In Modification 1, in the next Step S119, for a difference between the second standard deviation SDep and the first standard deviation SDbp, the surrounding environment judging unit 154 sets an evaluation threshold in consideration of an internal design specific to the balance, and evaluates the surrounding environment of the balance. Specific examples of the surrounding environment evaluation are shown below.

Example 1

(1) As an example, an evaluation threshold is set by using a display count of 1d of the balance (the display count of the balance means the smallest digit of a weighed value displayed on the display unit, and in a balance with minimum display of 1 μg, 1d=0.000001 g, and in a balance with minimum display of 0.1 mg, 1d is 0.0001 g).

(2) Assume an internal design specific to the balance 1 that the minimum display is 1 μg, in further consideration of a weighing capacity of the balance 1, an evaluation threshold is set. For example, when the weighing capacity of the balance 1 is 20 g, an evaluation threshold for rank "A" is set to 2d, and when the weighing capacity of the balance 1 is 5 g, an evaluation threshold for rank "A" is set to a more stringent value of 1d.

(3) In a case where evaluation thresholds of the balance 1 are set as follows:
Evaluation A: SDep−SDbp is 1d or less
Evaluation B: SDep−SDbp is more than 1d and not more than 3d
Evaluation C: SDep−SDbp is more than 3d, and when a second standard deviation SDep=3.0 μg, and a first standard deviation SDbp=1.5 μg, are obtained in the balance 1, $$3.0 \text{ μg} - 1.5 \text{ μg} = 1.5 \text{ μg} = 1.5d$$

is obtained, and therefore, evaluation "B" is judged.

When SDbp exceeds SDep, evaluation is made impossible. However, it is considered that SDbp exceeding SDep rarely takes place.

Example 2

On the assumption that the first standard deviation SDbp is the performance that the balance 1 can currently exhibit, the second standard deviation SDep obtained accompanied by the series of opening and closing operations can be considered to be a synthesis of the current performance of the balance (first standard deviation SDbp) and that corresponding to an influence of door opening and closing (standard deviation SDoc (open-close)). From additivity of variance, the square of SDep can be expressed as a sum of the square of SDbp and the square of SDoc. Therefore, the standard deviation SDoc corresponding to the influence of door opening and closing can be obtained by Numerical Formula 1:

$$SPoc = \sqrt{(SDep)^2 - (SDbp)^2}$$ [Numerical Formula 1]

For this standard deviation SDoc corresponding to the influence of door opening and closing, evaluation thresholds are set in consideration of an internal design specific to the balance, and a surrounding environment of the balance 1 is evaluated.

(1) As an example, evaluation thresholds are set by using a display count of 1d of the balance.
(2) In consideration of the internal design specific to the balance 1, an evaluation threshold for rank "A" is set to a more stringent value of 0.5d.
(3) In a case where evaluation thresholds of the balance 1 are set as follows:
Evaluation A: SDoc is 0.5d or less
Evaluation B: SDoc is more than 0.5d and not more than 1.0d
Evaluation C: SDoc is more than 1.0d, and
when the standard deviation SDoc=1.92 µg corresponding to the influence of door opening and closing is obtained in the balance 1, evaluation "C" is judged.

However, those described above are mere examples, and the values of evaluation thresholds and corresponding ranks shall be designed by comprehensively considering the internal design specific to the balance (including not only the minimum display and the weighing capacity, but also, for example, the type of the weight sensor of the balance, the internal structure and airtightness of the main body case, etc.). Further, in the examples described above, the display count of 1d used for setting of evaluation thresholds was used to convert the unit from 1 g (gram) into a smaller unit, and the setting may be made with the units of 1 g (gram) used without change, and this does not preclude using any other units.

Figure 7:
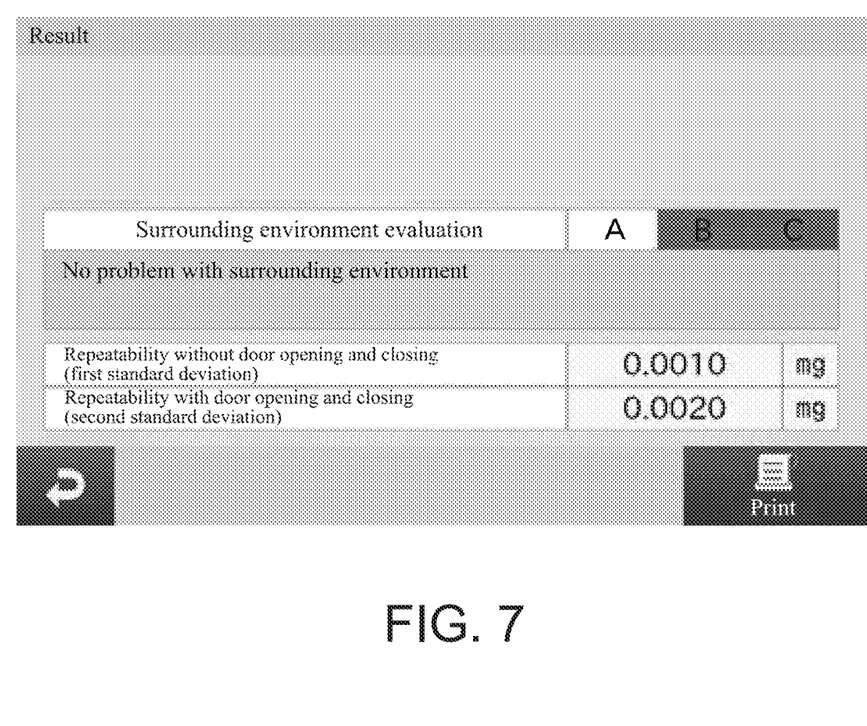
FIG. 7 illustrates a display example of an evaluation result in the same flow.

Next, the processing shifts to Step S120, and the surrounding environment judging unit 154 displays, in addition to the numerical values of the respective standard deviations SDbp and SDep, an evaluated level and a comment corresponding to the level on the display unit 6. As an example, the display unit 6 displays "No problem with surrounding environment" when evaluation A is judged, "Performance may be influenced by wind" when evaluation B is judged, and "Performance has deteriorated by wind. Take measure to avoid wind" when evaluation C is judged. FIG. 7 illustrates a display example of an evaluation result.

Figure 8:
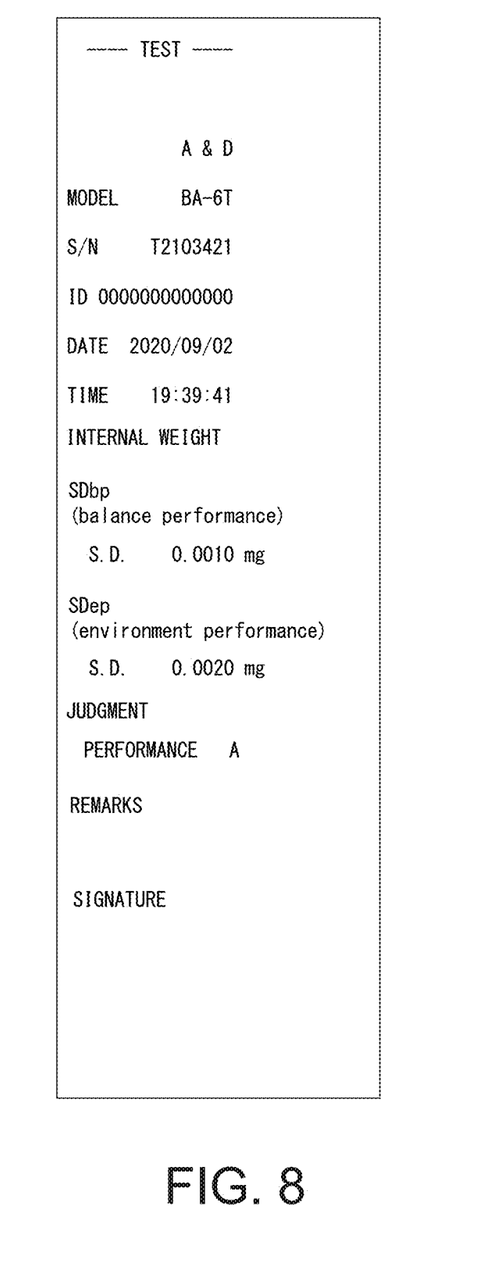
FIG. 8 illustrates an output example of an evaluation result in the same flow.

Note that it is also possible to output surrounding environment judgment and evaluation results from the balance 1 to an external device such as a printer or a personal computer by an RS232C cable, a USB, or BLE (Bluetooth low energy. Bluetooth is a registered trademark). FIG. 8 illustrates an output example of an evaluation result to a printer.

According to Modification 1, a surrounding environment is represented in the form of evaluation, so that a user can more easily understand and imagine the magnitude of an influence of the surrounding environment.

Modification 2

Figure 9:
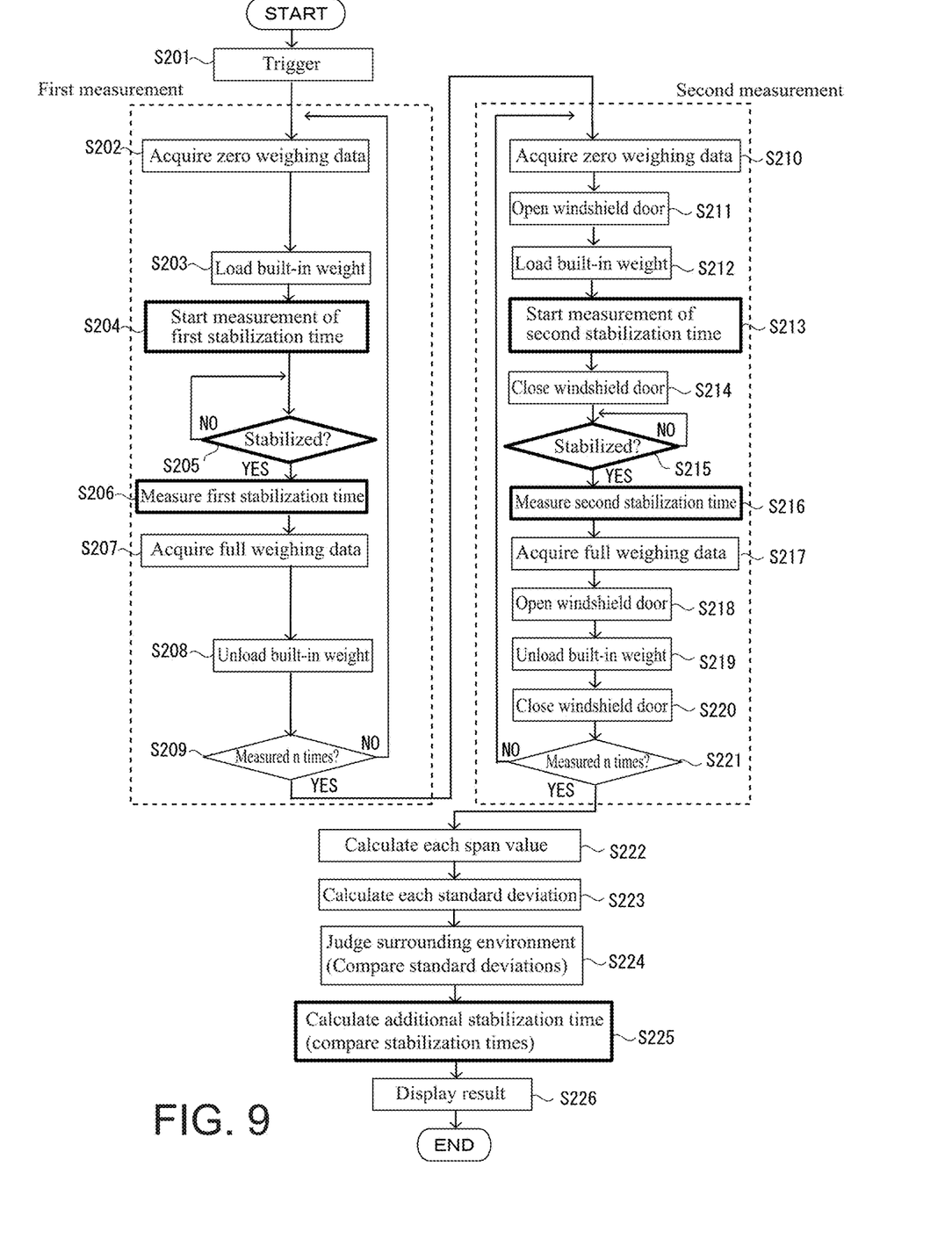
FIG. 9 is a flowchart of surrounding environment judgment according to Modification 2 of the embodiment of the present invention.

An electronic balance according to Modification 2 of the embodiment of the present invention has the same configuration as in the embodiment (FIG. 1). Besides this configuration, the balance 1 of Modification 2 performs the following surrounding environment judgment. FIG. 9 is a flowchart of surrounding environment judgment according to Modification 2 of the embodiment of the present invention.

First, in Step S201, in the same manner as in the embodiment (FIG. 5), when start is selected from the surrounding environment judgment menu, this triggers the surrounding environment judgment of Modification 2 to start.

As the surrounding environment judgment starts, first, the first measurement is performed in which measurements are made while the doors of the windshield 3 are left closed (Steps S202 to S209).

In Step S202, after the acquisition time elapses, the weighing unit 151 acquires zero weighing data. Next, in Step S203, the weight applying and removing control unit 153 controls the weight applying and removing mechanism 14 to load the built-in weight 13 on the load receiving portion 143.

Here, at the same time as loading of the built-in weight 13, the surrounding environment judging unit 154 starts the timer 8 in Step S204.

Next, the processing shifts to Step S205, and the surrounding environment judging unit 154 determines whether fluctuation in full weighing data of the built-in weight 13 has been stabilized (whether the fluctuation in full weighing data has fallen within a predetermined range stored in advance in the memory). When the fluctuation is not stabilized (No), the processing continuously waits for stabilization, and when the fluctuation is stabilized (Yes), the processing shifts to Step S206.

As the processing shifts to Step S206, the surrounding environment judging unit 154 stops the timer 8, and measures the time taken until the fluctuation in full weighing data is stabilized in the first measurement (hereinafter, referred to as a first stabilization time).

Next, in Step S207, the weighing unit 151 acquires full weighing data of the built-in weight after the first stabilization time T1 elapses.

Next, in Step S208, the weight applying and removing control unit 153 controls the weight applying and removing mechanism 14 to unload the built-in weight 13 from the load receiving portion 143. Next, in Step S209, the surrounding environment judging unit 154 determines whether the number of measurements has reached the number of times (n times) set in advance. When the set number of times is not reached (No), the processing returns to Step S202. When the set number of times is reached (Yes), the processing shifts to Step S210. n is preferably 5 to 10. At the second and subsequent times, zero weighing data may also be acquired after the first stabilization time T1.

As the first measurement is finished, next, the second measurement is performed in which measurements are made accompanied by opening and closing of the door of the windshield 3 (Steps S210 to S221).

In Step S210, after the acquisition time elapses, the weighing unit 151 acquires zero weighing data. Next, in Step S211, the door opening and closing control unit 152 controls the door opening and closing mechanism 12 to open either the left or the right door (set by a user. Hereinafter, a case where the right door 34 is opened is described). Due to opening of the right door 34, the environment in the weighing chamber is influenced by an environment outside the weighing chamber. Next, in Step S212, the weight applying and removing control unit 153 controls the weight applying and removing mechanism 14 to load the built-in weight 13 on the load receiving portion 143.

Here, at the same time as loading of the built-in weight 13, the surrounding environment judging unit 154 starts the timer 8 in Step S213.

Next, the processing shifts to Step S214, and the door opening and closing control unit 152 controls the door opening and closing mechanism 12 to close the right door 34.

Next, the processing shifts to Step S215, and the surrounding environment judging unit 154 determines whether fluctuation in full weighing data of the built-in weight 13 has been stabilized (whether the fluctuation in the full weighing data has fallen within a predetermined range stored in advance in the memory). When the fluctuation is not stabilized (NO), the processing continuously waits for stabilization, and when the fluctuation is stabilized (YES), the processing shifts to Step S216.

As the processing shifts to Step S216, the surrounding environment judging unit 154 stops the timer 8, and measures the time taken until the fluctuation in the full weighing data is stabilized in the second measurement (hereinafter, referred to as "second stabilization time").

Next, in Step S217, the weighing unit 151 acquires full weighing data of the built-in weight 13 after the second stabilization time T2 elapses. Next, in Step S218, the door opening and closing control unit 152 controls the door opening and closing mechanism 12 to open the right door 34. Due to opening of the right door 34, the environment in the weighing chamber is influenced by an environment outside the weighing chamber again. Next, in Step S219, the weight applying and removing control unit 153 controls the weight applying and removing mechanism 14 to unload the built-in weight 13 from the load receiving portion 143. Next, in Step S220, the door opening and closing control unit 152 controls the door opening and closing mechanism 12 to close the right door 34. Next, in Step S221, the surrounding environment judging unit 154 determines whether the number of measurements has reached the number of times (n times) set in advance. When the set number of times is not reached (No), the processing returns to Step S210. When the set number of times is reached (Yes), the processing shifts to Step S222. n is the same number as in the first measurement, and is preferably 5 to 10. At the second and subsequent times, zero weighing data may also be acquired after the second stabilization time T2.

Next, in Steps S222 to S224, as in Steps S16 to S18 of the embodiment, the surrounding environment judging unit 154 calculates span values of the first measurement and the second measurement, calculates the first standard deviation SDbp and the second standard deviation SDep, and judges the surrounding environment by comparing SDbp and SDep.

Next, in Step S225, the surrounding environment judging unit 154 compares the first stabilization time T1 and the second stabilization time T2, and when T2 is longer than T1, calculates a time by subtracting the first stabilization time T1 from the second stabilization time T2, as an "additional stabilization time dT" until stabilization of weighing data influenced by door opening and closing. When T1 exceeds T2, calculation is made impossible. However, it is considered that T1 exceeding T2 rarely takes place.

Next, the processing shifts to Step S226, and the surrounding environment judging unit 154 displays the first stabilization time T1, the second stabilization time T2, and the additional stabilization time dT on the display unit 6 as well as the first standard deviation SDbp and the second standard deviation SDep. For example, on the display unit 6, "Please wait for [additional stabilization time dT] more seconds until stabilization of weighed value influenced by surrounding environment due to door opening and closing" is displayed.

According to Modification 2, since numerical values of the first stabilization time T1, the second stabilization time T2, and the additional stabilization time dT are displayed, a user can be notified how long the user should wait until the influence of the surrounding environment decreases under actual use conditions at the time of weighing.

Preferred embodiments and modifications of the present invention have been described above, and each embodiment and each modification can be combined based on knowledge skilled in the art, and such a combined embodiment is included in the scope of the present invention.

REFERENCE SIGNS LIST

1 Electronic balance
2 Weighing pan
3 Windshield
   33 Left door (door)
   34 Right door (door)
4 Balance main body
5 Operation unit
6 Display unit
8 Timer
11 Weight sensor
12 Door opening and closing mechanism
13 Built-in weight
14 Weight applying and removing mechanism
15 Control unit
   151 Weighing unit
   152 Door opening and closing control unit
   153 Weight applying and removing control unit
   154 Surrounding environment judging unit

The invention claimed is:

1. An electronic balance comprising:
a weighing pan on which a to-be-weighed object is placed;
a windshield surrounding the weighing pan;
a door opening and closing mechanism configured to automatically open and close a door of the windshield;
a weight sensor to which a load applied to the weighing pan is transmitted;
a built-in weight to be loaded on and unloaded from the weight sensor;
a weight applying and removing mechanism for the built-in weight; and
a control unit configured to measure a standard deviation of the built-in weight and control the door opening and closing mechanism and the weight applying and removing mechanism, wherein
the control unit is further configured to obtain
a first standard deviation measured while the door of the windshield is left closed, and
a second standard deviation measured accompanied by a series of opening and closing operations consisting of opening the door by the door opening and closing mechanism, loading the built-in weight by the weight applying and removing mechanism, closing the door by the door opening and closing mechanism, acquiring weighing data of the built-in weight, opening the door by the door opening and closing mechanism, unloading the built-in weight by the weight applying and removing mechanism, and closing the door by the opening and closing mechanism.

2. The electronic balance according to claim 1, wherein when the second standard deviation is larger than the first standard deviation, the control unit notifies a user that there is an influence from a surrounding environment caused by opening and closing of the door.

3. The electronic balance according to claim 1, wherein the control unit is further configured to rank a difference value between the second standard deviation and the first standard deviation, or a square root value of a difference between the square of the second standard deviation and the square of the first standard deviation according to an evaluation threshold set in consideration of an internal design of the electronic balance, and evaluates an influence from a surrounding environment caused by opening and closing of the door.

4. The electronic balance according to claim 1, wherein the control unit is further configured to measure a first stabilization time until fluctuation in weighing data of the built-in weight is stabilized when measuring the first standard deviation, and a second stabilization time until fluctuation in weighing data of the built-in weight is stabilized when measuring the second standard deviation, and when the second stabilization time is longer than the first stabilization time, calculates a time as an additional stabilization time by subtracting the first stabilization time from the second stabilization time, and notifies a user of the additional stabilization time.

5. A method for judging a surrounding environment of an electronic balance which is a method for judging a surrounding environment of an electronic balance comprising a weighing pan on which a to-be-weighed object is placed, a windshield surrounding the weighing pan, a door opening and closing mechanism configured to automatically open and close a door of the windshield, a weight sensor to which a load applied to the weighing pan is transmitted, a built-in weight to be loaded on and unloaded from the weight sensor, a weight applying and removing mechanism for the built-in weight, and a control unit configured to measure a standard deviation of the built-in weight and control the door opening and closing mechanism and the weight applying and removing mechanism, comprising:

a step of measuring a first standard deviation of the built-in weight by repeating loading and unloading of the built-in weight by the weight applying and removing mechanism while the door of the windshield is left closed; and a step of measuring a second standard deviation of the built-in weight by repeating a series of opening and closing operations consisting of opening the door by the door opening and closing mechanism, loading the built-in weight by the weight applying and removing mechanism, closing the door by the door opening and closing mechanism, acquiring weighing data of the built-in weight, opening the door by the door opening and closing mechanism, unloading the built-in weight by the weight applying and removing mechanism, and closing the door by the opening and closing mechanism.

* * * * *